United States Patent

Schmalfeld et al.

[11] Patent Number: 5,584,970
[45] Date of Patent: Dec. 17, 1996

[54] PROCESS OF PRODUCING WOOD CHARCOAL IN A MOVING BED

[75] Inventors: Jörg Schmalfeld, Friedrichsdorf; Hans J. Eichwald, Rüsselsheim; Udo Zentner, Griesheim, all of Germany

[73] Assignee: Metallgesellschaft Aktiengesellschaft, Frankfurt am Main, Germany

[21] Appl. No.: 400,167

[22] Filed: Mar. 7, 1995

[30] Foreign Application Priority Data

Mar. 12, 1994 [DE] Germany ............... 44 08 455.2

[51] Int. Cl.$^6$ ............... C10B 47/20; C10B 53/02
[52] U.S. Cl. ............... 201/27; 201/29; 201/34; 201/37; 201/39; 201/43
[58] Field of Search ............... 201/27, 29, 34, 201/37, 39, 43

[56] References Cited

U.S. PATENT DOCUMENTS

| | | | |
|---|---|---|---|
| 2,289,917 | 7/1942 | Lambiotte | 201/43 |
| 3,424,556 | 1/1969 | Johnson | 201/29 |
| 4,115,202 | 9/1978 | Lorenz et al. | 201/34 |
| 4,329,202 | 5/1982 | White et al. | 201/27 |
| 4,439,307 | 3/1984 | Jaquay et al. | 201/29 |
| 4,718,894 | 1/1988 | McConaghy, Jr. et al. | 202/99 |
| 4,935,099 | 6/1990 | Weiss et al. | 201/27 |

FOREIGN PATENT DOCUMENTS

| | | |
|---|---|---|
| 836515 | 6/1976 | Belgium . |
| 0070710 | 1/1983 | European Pat. Off. . |
| 0347972 | 12/1989 | European Pat. Off. . |
| 2528062 | 12/1983 | France . |
| 622930 | 1/1936 | Germany . |

Primary Examiner—Jill Warden
Assistant Examiner—Robert Carpenter
Attorney, Agent, or Firm—Sprung Horn Kramer & Woods

[57] ABSTRACT

The biomass, particularly lump wood, is supplied to a shaft reactor at its top and is initially preheated to temperatures of about 150° to 280° C. and dried by a counterflowing hot gas. This is followed by a treatment in an underlying carbonizing zone, the upper portion of which is supplied with hot purging gas at a temperature of 250° to 600° C. The hot purging gas flows downwardly through the carbonizing zone co-currently with the wood. A gas mixture which contains purging gas and gas produced by carbonization is withdrawn from the lower portion of the carbonizing zone and is at least in part combusted outside the shaft reactor to produce a combustion gas, which is used at least in part as hot purging gas.

3 Claims, 1 Drawing Sheet

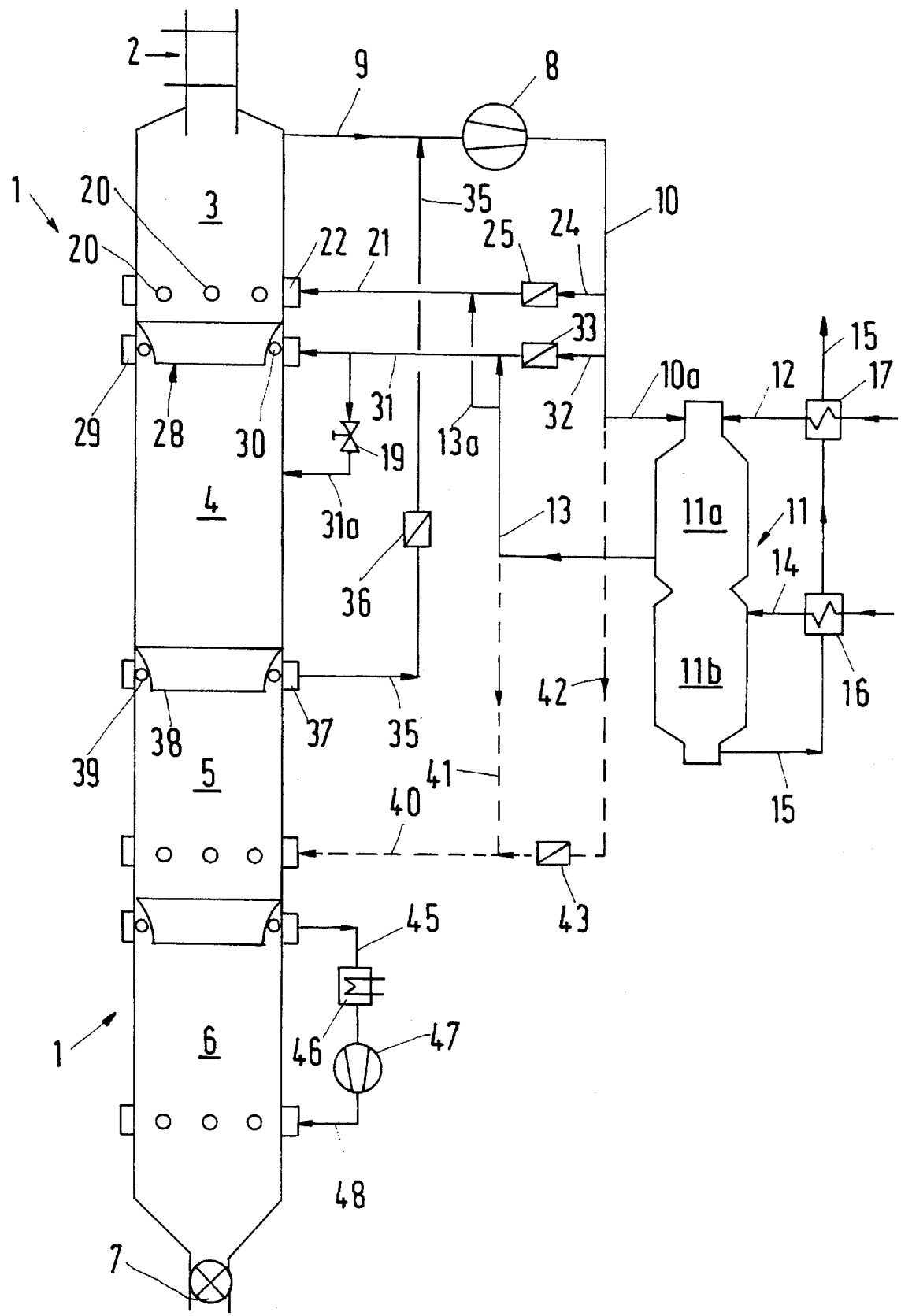

PROCESS OF PRODUCING WOOD CHARCOAL IN A MOVING BED

This invention relates to a process of producing coal, particularly wood charcoal, from biomass, particularly wood, in a moving bed in a shaft reactor which is flown through by a hot gas and which is fed with the biomass at its top and from the lower portion of which the coal is carried away. The feedstock usually consists mainly of lump wood but the process can also be used for wood derivatives, lump lignin, shaped bodies of biomass or coconut shells. Whereas reference will be made hereinafter mainly to wood and wood charcoal for the sake of simplicity, the explanations will also be applicable to the other feedstocks for the process.

The process described first hereinbefore for preparing wood charcoal is known from European Patent 0 347 972 and from the corresponding U.S. Pat. No. 4,935,099. In the known process, a hot purging gas used as a heat transfer fluid rises through the carbonizing zone, i.e., the purging gas flows in a countercurrent to the wood, which moves downwardly.

It is an object of the invention so to develop the known process that the conditions in the carbonizing zone can be more effectively controlled. Besides, a high-grade wood charcoal having a high stability and a high carbon content is to be produced. In the process described first hereinbefore this is accomplished in accordance with the invention in that the biomass is dried and is preheated to temperatures of about 150° to 280° C. and is then fed in the shaft reactor to the upper portion of a carbonizing zone, hot purging gas at a temperature from 250° to 600° C. is supplied to said upper portion of the carbonizing zone, the hot purging gas is conducted downwardly through the carbonizing zone co-currently with the moving bed, a gas mixture containing purging gas and gas produced by carbonization is withdrawn from the lower portion of the carbonizing zone, at least part of the gas mixture which has been withdrawn is combusted, and at least a part of the resulting combustion gas is used as a hot purging gas. The gases produced by carbonization are released as the wood is heated.

Contrary to the known process the invention provides that the hot purging gas is conducted downwardly through the carbonizing zone co-currently with the wood being carbonized. As a result, the wood is heated in the upper portion of the carbonizing zone so that volatile constituents of the wood are released. The condition under which the temperature of the wood rises further as a result of exothermic reactions which are initiated as the carbonization proceeds is reached approximately in the middle portion of the carbonizing zone. It is known that said exothermic reactions are mainly due to the oxygen contained in the biomass. The purging gas and the gases produced by carbonzation attenuate the generation of heat by the exothermic reactions so that the wood will be coked at a substantially controlled time-temperature pattern also in the lower portion of the carbonizing zone whereas an excessively fast temperature rise will be avoided. Such a temperature control cannot be achieved in a countercurrent operation of the wood and purging gas. In the process in accordance with the invention, care is taken that particularly the heavy tar will substantially remain in the piece of wood and will be coked slowly; this is very important for the strength of the wood charcoal.

The lump wood is desirably first passed in the shaft reactor through a preheating zone, which is disposed above the carbonizing zone and in which the wood is dried at the same time. Hot preheating gas at a temperature of 200° to 550° C. is supplied to the lower portion of the preheating zone and is caused to rise through the preheating zone in a counter-current to the feedstock and an exhaust gas that contains cooled preheating gas is withdrawn from the shaft reactor at its top. The exhaust gas contains mainly water vapor produced by the drying of the wood and may also contain combustible components, such as light tars, carbon monoxide, and methane. The exhaust gas is combusted to produce combustion gas, i.e., hot purging gas.

The lump wood which is being transformed to wood charcoal usually is in the carbonizing zone a residence time of about 5 to 30 hours and in most cases 10 to 20 hours. In the carbonizing zone a piece of wood is subjected to a temperature rise of 5° to 20° C. per hour so that a careful carbonization is effected. To achieve optimum carbonizing conditions, additional purging gas may be supplied to the carbonizing zone also below its top end.

A desirable feature of the process resides in that exhaust gas withdrawn from the top of the shaft reactor and the withdrawn gas mixture which contains purging gas and gases produced by carbonization are jointly combusted at least in part to produce a combustion gas which is virtually free of $O_2$ and is at a temperature of about 800° to 1400° C. and combustion gas is used as a purging gas. A partial stream of the combustion gas may be used as a preheating gas for drying the wood.

The exhaust gas withdrawn from the shaft reactor is usually not entirely combusted but a partial stream of the exhaust gas is mixed with combustion gas to effect a temperature control and such a gas mixture is used as a preheating gas and in the carbonizing zone as a hot purging gas.

To produce a wood charcoal which has a particularly high carbon content and a high strength it may be recommendable to provide in the shaft reactor below the carbonizing zone a calcining zone and to supply a hot calcining gas at a temperature in the range from 400° to 800° C. to the lower portion of the calcining zone to rise in the calcining zone.

Further features which may be adopted in the process will be explained with reference to the drawing.

The shaft reactor 1 comprises an input lock chamber 2, a preheating zone 3, a carbonizing zone 4, a calcining zone 5, which may optionally be omitted, and a cooling zone 6. Biomass, such as lump wood, is fed from the input lock chamber 2 first into the preheating zone 3, which serves also to dry the wood, and the cooled wood charcoal product is withdrawn through the output lock chamber 7 at the lower end of the reactor 1. An exhaust gas which contains combustible components is sucked by the fan 8 in line 9 from the upper portion of the preheating zone 3 and is partly supplied through lines 10 and 10a to the combustion chamber 11. Preheated combustion air is supplied from line 12. The combustion chamber 11 comprises an upper portion 11a, in which the combustion is effected with a near-stoichiometric supply of oxygen so that the combustion gas withdrawn in line 13 is virtually free of $O_2$. The temperature of that combustion gas in line 13 is in the range from 800° to 1400° C., preferably in the range from 900° to 1200° C. Remaining exhaust gas is combusted in the lower portion 11b of the combustion chamber 11 by means of preheated combustion air which is supplied through line 14 at such a rate that the combustion is effected with a hyperstoichiometric supply of oxygen. The flue gas which is withdrawn in line 15 is suitably used first to preheat air in the heat exchangers 16 and 17 and is then discharged.

The lower portion of the drying and preheating zone 3 is supplied through openings 20 with the preheating gas, which is supplied in line 21 and first flows through a ring line 22. Gas is similarly supplied through a ring line and outlet openings also to the lower portion of the calcining zone 5 and to the lower portion of the cooling zone 6. To produce the preheating gas, a partial stream of the exhaust gas flowing in line 10 is withdrawn through line 24 and is passed through an adjustable damper 25 and is mixed in line 21 with hot combustion gas from lines 13 and 13a. At a temperature in the range from 200° to 550° C., preferably in the range from 250° to 400° C., the preheating gas from line 21 enters the lower portion of the preheating zone 3 and rises in that zone and leaves the reactor through the line 9. By the preheating gas the lump wood coming from the input lock chamber 2 is dried and preheated to temperatures of about 150° to 280° C. and usually from 180° to 250° C.

The dried and preheated lump wood forms a moving bed, which moves downwardly through a funnel-shaped conical annular chute 28 into the carbonizing zone 4. The annular chute 28 ensures an unrestrained access of the hot purging gas from the ring line 29 through the openings 30 into the upper portion of the carbonizing zone 4. The hot purging gas comes from the line 31 and consists of a partial stream of the exhaust gas, which partial stream is branched off through line 32 and is controlled by the adjustable damper 33, and of a partial stream of the combustion gas conducted in line 13. A partial stream of the hot purging gas may be supplied through the branch line 31a to the carbonizing zone below the openings 30. The rate of that partial stream is controlled by the flow control valve 19. That partial stream of purging gas may desirably be used to optimize the conditions in the carbonizing zone 4.

The hot purging gas in line 31 is at a temperature in the range from 250° to 600° C., preferably in the range from 300° to 450° C. and through the ring line 29 and the openings 30 enters the upper portion of the carbonizing zone 4 and flows downwardly in that zone co-currently with the moving bed consisting of the lump wood and of the wood charcoal which has been formed. Purging gas which has been used and the gases which have been produced by the carbonization are jointly withdrawn through line 35 from the lower end of the carbonizing zone 4 and under the control of the adjustable damper 36 are added to the exhaust gas in line 9. Adjacent to the lower portion of the carbonizing zone 4 design of the reactor is similar to the design at the upper end of the carbonizing zone 4 because an annular chute 38, gas supple openings 39 and a ring line 37 are provided.

Below the carbonizing zone 4 the reactor 1 comprises a calcining zone 5, which is not essential and may be omitted if the carbon content and strength of the wood charcoal product need not meet special requirements. In the calcining zone 5, calcining gas at a temperature in the range from 400° to 800° C. flows from line 40 upwardly in a countercurrent to the wood charcoal and together with the gas mixture arriving at the lower end of the carbonizing zone 4 is withdrawn through line 35. In the calcining zone the temperature rises further so that the carbon content of the wood charcoal is increased and more uniformly distributed. The calcining gas is also formed by a partial stream of the combustion gas conducted in line 13. That partial stream is supplied in line 41 and is mixed with a partial stream of exhaust gas supplied in line 42 past the adjustable damper 43.

The still hot wood charcoal product is passed at the lower end of the reactor 1 through a cooling zone 6, which is flown through by a rising cooling gas, which is circulated. The cooling gas consists, e.g., of cooled purging gas and is withdrawn through a line 45 and passed through a cooler 46 and by the fan is returned through line 48 to the cooling zone.

EXAMPLES

In a plant corresponding to that shown in the drawing, wood charcoal is produced from Brazilian lump wood (lump sizes in the range from 30° to 150 mm) supplied at a rate of 7260 kg/h. In Example 1, Eucalyptus urophylla having a water content of 15% by weight is processed in a shaft reactor 1, which comprises the calcining zone 5 whereas the line 31a has been omitted. In Example 2 the wood consists of Eucalyptus camaldulensis and contains 20% water and the shaft reactor is not provided with the calcining zone and with lines 31a and 40.

Gases at the following rates Q in $sm^3 h$ ($sm^3$=standard cubic meter) and temperatures T in ° C. are conducted in the various lines. The data have been calculated in part.

|      | Example 1 | | Example 2 | |
| --- | --- | --- | --- | --- |
| Line | Q | T | Q | T |
| 21 | 7800 | 500 | 9050 | 500 |
| 9 | 9150 | 105 | 10850 | 105 |
| 31 | 450 | 500 | 450 | 500 |
| 35 | 5850 | 435 | 3750 | 465 |
| 40 | 1575 | 650 | — | — |
| 48 | 4100 | 50 | 3400 | 50 |
| 45 | 4100 | 350 | 3400 | 350 |
| 10a | 8200 | 255 | 8070 | 225 |
| 12 | 7200 | 200 | 6300 | 200 |
| 13 | 3100 | 1150 | 3000 | 1075 |

|  | Example 1 | Example 2 |
| --- | --- | --- |
| Residence time in carbonizing zone 4 | 18 h | 22 h |
| Residence time in calcining zone 5 | 4 h | — |
| Rate at which wood charcoal is produced | 1850 kg/h | 2220 kg/h |
| Fixed carbon content of wood charcoal | 91 wt. % | 80 wt. % |

It will be understood that the specification and examples are illustrative but not limitative of the present invention and that other embodiments within the spirit and scope of the invention will suggest themselves to those skilled in the art.

We claim:

1. A process of producing charcoal from lump biomass in a downwardly moving bed in a shaft reactor, said process comprising the steps of a) feeding said lump biomass into the upper part of said shaft reactor, said reactor containing in its upper part a preheating zone for preheating and drying said biomass, below said preheating zone said reactor containing a carbonizing zone for carbonizing the biomass coming from said preheating zone, and below said carbonizing zone being a cooling zone within said reactor for cooling solids of said moving bed;

b) from said reactor above its preheating zone withdrawing an exhaust gas containing combustible components and feeding a portion of said exhaust gas into a combustion chamber, from said combustion chamber withdrawing a first combustion gas being practically free of $O_2$ (molecular oxygen) and having a temperature in the range from 800° to 1400° C.

c) combining said combustion gas with a first and a second non-combusted portion of the exhaust gas to form a first and a second mixture of hot gases, respectively, said first mixture of hot gases having a temperature in the range from 200° to 550° C. and said second mixture having a temperature in the range from 250° to 600° C., feeding said first mixture into the lower part of said preheating zone, said first mixture flowing upwardly in the moving bed within said preheating zone;

d) in said preheating zone said biomass being preheated to temperatures from 150° to 280° C., the preheated biomass moving downwardly to the uppermost part of said carbonizing zone, feeding said second mixture of hot gases as a purging gas into the upper part of said carbonizing zone and drawing said purging gas through said moving bed co-currently with said bed downwardly to the lower part of said carbonizing zone and withdrawing said purging gas and gases produced by carbonization from said shaft reactor and feeding at least a portion of said withdrawn gases into said combustion chamber, the residence time of said bed in said carbonizing zone being 5 to 30 hours;

e) the moving bed leaving said carbonizing zone being composed of charcoal, and cooling the charcoal in the cooling zone of said shaft reactor.

2. A process according to claim 1, including the additional step of supplying additional hot purging gas at a temperature in the range from 300° to 600° C. to the carbonizing zone below the upper portion thereof.

3. A process according to claim 1, including the additional step of supplying a calcining gas at a temperature from 400° C. to 800° C. to the lower portion of a calcining zone provided in the reactor below the carbonizing zone, the calcining gas rising from said lower portion.

* * * * *

UNITED STATES PATENT AND TRADEMARK OFFICE
CERTIFICATE OF CORRECTION

PATENT NO. : 5,584,970
DATED : December 17, 1996
INVENTOR(S) : Schmalfeld, et al.

It is certified that error appears in the above-indentified patent and that said Letters Patent is hereby corrected as shown below:

Title Page      U.S. PATENT DOCUMENTS: Delete " 4,718,894 " and substitute -- 4,718,984 --

Col. 4, line 60      After " 1400°C. " insert -- ; --

Signed and Sealed this

Twenty-fourth Day of June, 1997

Attest:

BRUCE LEHMAN

*Attesting Officer*      *Commissioner of Patents and Trademarks*